Patented Jan. 1, 1946

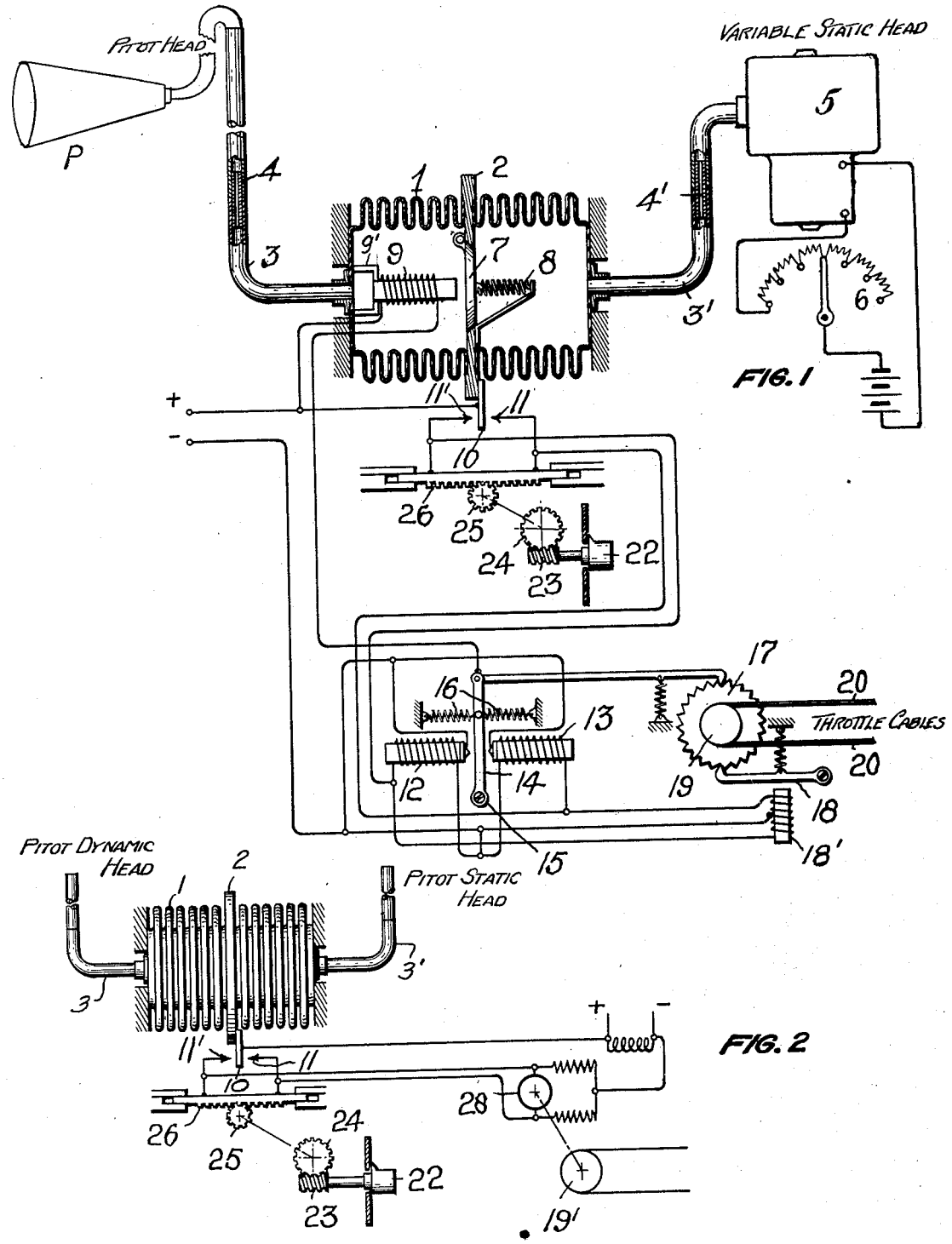

2,391,896

UNITED STATES PATENT OFFICE 2,391,896

AIR-SPEED REGULATOR FOR AIRCRAFT

Gerald N. Hanson, Allendale, N. J., assignor to Sperry Gyroscope Company, Inc., Brooklyn, N. Y., a corporation of New York Application September 28, 1940, Serial No. 358,858

6 Claims. (Cl. 244—78)

This invention relates to the control of the operation of an aircraft by means responsive to its air speed. It has been proposed to control either or both the engine speed and/or the climb or dive angle of the craft by such air speed responsive means, and my invention in its broad aspect has application to both means of control. More particularly, however, my invention constitutes an improvement in such means for controlling the throttle of the engines, such as disclosed in the prior patent to Mortimer F. Bates, No. 2,160,194, for Automatic engine throttle control, dated May 30, 1939. As therein shown, a Pitot tube is used as the means for creating an air pressure proportional to air speed. Such means, however, is not entirely satisfactory and one purpose of the present invention is to improve such means so that its indications are not affected by change in density of the air as the aircraft rises to different heights.

Another object of the invention is to design the device so that the air speed regulating device may be readily controlled at will from a point remote from the automatic controller which is responsive to air speed.

A further object of the invention is to provide a throttle control which operates in small steps so that over-control with resultant hunting cannot occur.

My invention, in its broad aspect, also may have application in other fields than aircraft engine control. Thus, my differential pressure regulator may be used to maintain a variable quantity or condition at a predetermined or standard value by deriving a differential pressure corresponding in sense and magnitude to the sense and magnitude of deviation of said condition or quantity from the predetermined value, and controlling thereby a means tending to restore the variable quantity to its predetermined value and for simultaneously and temporarily equalizing the variable and static pressure after which the variable is again allowed to assume control of one pressure device, so that the system will readjust itself in steps until the predetermined value is arrived at.

Referring to the drawing, showing two forms of my invention:

Fig. 1 is a diagram illustrating one form of the invention.

Fig. 2 is a similar diagram illustrating a slight modification of the same.

As the primary controller which is responsive to air speed, I have shown a metallic bellows or expansible container 1 fixed at both ends and having a dividing wall 2 between the two halves thereof, the whole constituting in effect two abutting bellows or Sylphons. As it is well known, each section of bellows 1 tends to elongate itself, the casing acting as a spring under compression. This extending action of each section is opposed in the present case only by the force exerted by the pressure in the other section. With equal pressure in both sections, the dividing wall 2 will assume a central or neutral position. At one end of the bellows I connect a pipe 3 leading through a suitable restriction 4 to some suitable form of air speed measuring device, such as a Pitot tube P. The opposite half of the bellows I connect through a similar pipe 3' and restriction 4' to a source of normally fixed air pressure or static head which, however, may be varied at will when it is desired to change air speed. As illustrative of such source I have shown a motor driven air pump 5, the speed of the motor being readily controlled through a variable resistance or rheostat 6.

The diaphragm 2 separating the two chambers of the bellows is shown as having a flap valve 7 therein which is normally held closed by a tension spring 8, but may be opened by excitation of an electromagnet 9 fixedly mounted within bellows 1 as by a bracket 9' fastened to the fixed wall of bellows 1. Electromagnet 9 is designed so that upon energization its magnetic force will be sufficient to overcome the tension of spring 8 and to attract valve flap 7 to the end of magnet 9, whereby valve 7 is opened and the two parts of bellows 1 are allowed to communicate with one another and equalize their respective pressures. Since magnetic force varies inversely as the square of the distance, it will be seen that once flap 7 starts to move, the force will increase, so that the valve flap 7 will be opened all the way. Spring 8 is designed to keep valve flap 7 closed for all pressure differentials in the two parts of bellows 1 which may be met in practice. The dividing or common wall 2 is shown as carrying a contact plate 10 or other form of controller, movable between spaced contacts 11 and 11' so that, upon increase in air speed, contact 10—11 will be completed and upon decrease in air speed, the contact 10—11' will be completed. Each of said contacts is in circuit with the solenoid 9 so that in either case the flap valve 7 is opened and the pressure on the two sides of the diaphragm equalized. As soon as this occurs the dividing wall 2 will be centralized by the resilient centralizing action of the bellows, thus opening the contacts and deenergizing winding 9, and allowing valve 7 to be closed by spring 8, so that all the parts are restored to their neutral positions.

Excitation of one contact 11 or 11' brings into action some form of servo motor to move the engine throttle in one direction while excitation of the other contact does the reverse. To this end, the closure of contact 11 is also shown as exciting electromagnet 12, while closure of contact 11' excites electromagnet 13. Said magnets are positioned on opposite sides of armature 14, pivoted at 15 and normally centralized by spring 16. Upon pull of the armature to the left in Fig. 1, for instance, a ratchet wheel 17 is pulled one notch counter-clockwise, in which position it is held by the locking pawl 18, which is released by electromagnet 18' when excitation of either of electromagnets 12 or 13 occurs. Excitation of the magnet 13, on the other hand, pushes the ratchet wheel 1 tooth clockwise. By this or similar means a step-by-step action is secured. For operating the throttle I have shown a pulley 19 on the shaft of ratchet wheel 17, connected by cables 20 to the adjacent throttle (not shown).

Variations in engine speed may be accomplished not only by rheostat 6 but also by adjusting a setting knob 22 which is shown as rotating through worm 23 and worm wheel 24, a pinion 25 which positions a rack bar 26 carrying the normally fixed contacts 11 and 11'. By adjusting these contacts to the right, for instance, in Fig. 1, it will be evident that an increased speed would be obtained since the left-hand end of the bellows will have to expand further in order to close contact 11. Similarly, adjustment to the left will result in reduced air speed.

From the foregoing, the operation of my device will be readily apparent. Since both sides of the bellows are supplied with air, any changes in atmospheric pressure are completely compensated for and changes of temperature likewise will not materially affect the device. Upon a change of air speed or in case of change in adjustment of the rheostat 6 or in case of movement of handle 22, one of the contacts 11 or 11' will be made, thus moving the ratchet wheel through one notch, at the same time equalizing the pressure within the bellows due to the opening of the flap valve and reopening the contacts as explained above. If, then, the proper air speed has not been attained, the same cycle will repeat and the wheel will be moved through another notch in the same direction until the proper air speed is obtained. Hunting, however, is prevented by the step-by-step action of both the bellows and servo motor, which gives the airplane time to respond to the change in the throttle position before the throttle is again readjusted.

In Fig. 2 the arrangement is similar except that instead of a pawl and ratchet servo motor for operating the throttle cable, I have merely shown a reversible self-braking motor 28 which operates in equivalent fashion to adjust the cable drum 19'. Its action will also be in steps, as will be seen from the following considerations.

In normal flight, pressure in the two sections of container 1 is made equal by adjustment of rheostat 6 to render the pressure in the pump side equal to the pressure in the Pitot tube side thereof at the desired air speed. In the form shown in Fig. 2, the equivalent is accomplished by adjustment of the knob 22, which shifts the relative position of the contacts 11 and 11' and movable wall 10. This has the same general effect as varying the air pressure in the static or right-hand compartment, since the point at which contact is made depends not only upon the differential air pressure, but upon the resilient centralizing pressure exerted by the resilient walls of the container, as hereinbefore set forth. Should the pressure derived from the dynamic head 1 increase in either Fig. 1 or Fig. 2, dividing wall 2 will be moved toward the right in this illustration and contact 10 will be connected to contact 11, thereby energizing motor 28 and rotating the cable drum 19' operating the throttle. However, the same action energizes magnet 9, as in Fig. 1, and thereby opens flap valve 7, equalizing the pressure in the two sections of container 1, and causing contact 10 to again centralize itself between contacts 11 and 11'. This interrupts the circuit of motor 28 which thereupon stops. If the change in position of motor 28 and cable drum 19' is not sufficient to change the airspeed enough to cause the pressure in the two sections of bellows 1 to become equal, this cycle of events will be repeated until the pressures in the two sections of bellows 1 do become equalized. It will thus be clear that the operation of motor 28 and cable drum 19' will be in steps in much the same fashion as ratchet arrangement 17.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. A pressure regulating system comprising a pressure responsive device differentially subject to a pressure to be regulated and static pressure, means controlled by said device for adjusting said regulatable pressure, means responsive to energization of said other means for neutralizing the pressure difference between said static and said regulatable pressures and means for restoring said pressure differential after operation of said adjusting means, whereby said system will adjust said regulatable pressure in steps until said pressure equals said static pressure without hunting.

2. In an air speed responsive device for automatically controlling the operation of an aircraft, the combination including an expansible container subject to air pressure which varies with air speed, a second expansible container variable at will to balance the air speed pressure at the desired air speed, a valve connection between said containers, a servo motor for controlling the speed of the craft, controlling means responsive to displacement of a movable wall of said containers for operating said motor, and means also operable by said means for temporarily opening said valve to equalize the pressure in said containers and for deenergizing said motor, whereby said motor is operated in steps.

3. In an automatic engine throttle control for aircraft, means including an electric motive means for changing the throttle adjustment, means including reversing contacts for operating said motive means in either direction, means including a pair of expansible containers for operating said contacts, one of said containers being subject to air pressure variable with air speed and the other variable at will to balance the air speed pressure at the desired air speed, a normally inoperative pressure equalizing valve between said containers, and electromagnetic means operable on closing of said contacts for opening said valve, whereby said throttle is adjusted in small steps.

4. In an automatic air speed control for aircraft, means including an electric motive means for changing the adjustment of an air speed changing means, means including reversing contacts for operating said motive means in either direction, means including a pair of expansible containers for operating said contacts, one of said containers being subject to air pressure variable with air speed and the other variable at will to balance the air speed pressure at the desired air speed, a normally inoperative pressure equalizing valve connected between said containers, and electromagnetic means operable on closing of said contacts for opening said valve, whereby said means is adjusted in small steps.

5. In an automatic engine throttle control for aircraft, motive means for changing the throttle adjustment of said craft in either direction, means including a pair of opposing expansible containers for controlling said motive means, one of said containers being subject to air pressure variable with air speed and the other being variable at will to balance the desired air speed pressure, normally inoperative pressure equalizing means connected between said containers, and means for operating said pressure equalizing means to equalize pressure between said two containers simultaneously with the operation of said motive means.

6. A regulating system for automatically maintaining a variable adjustable quantity at a predetermined value, comprising means for deriving a differential pressure corresponding in sense and magnitude to the sense and magnitude of deviation of said quantity from said predetermined value, differential pressure responsive means for initially adjusting said quantity to reduce said deviation, means likewise responsive to such differential pressure means for temporarily neutralizing said differential pressure, and means for thereafter re-establishing control of said pressure differential by said variable quantity, whereby, if said quantity has not been restored to said predetermined value by said initial adjustment, said adjusting means is actuated in steps until said quantity reaches said value.

GERALD N. HANSON.